(12) United States Patent
Yukawa et al.

(10) Patent No.: US 10,955,958 B2
(45) Date of Patent: Mar. 23, 2021

(54) INFORMATION PROCESSING APPARATUS AND INFORMATION PROCESSING METHOD

(75) Inventors: Shuhei Yukawa, Nagano (JP); Daisuke Kurosaki, Nagano (JP); Souichi Tsukahara, Nagano (JP); Hanae Higuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/325,625

(22) Filed: Dec. 14, 2011

(65) Prior Publication Data

US 2012/0154408 A1   Jun. 21, 2012

(30) Foreign Application Priority Data

Dec. 20, 2010   (JP) .............................. JP2010-282955

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1601* (2013.01); *G06F 3/0428* (2013.01); *G06F 3/0488* (2013.01); *G06F 2203/0339* (2013.01)

(58) Field of Classification Search
CPC ...... G06F 3/041; G06F 3/0412; G06F 3/0421; G06F 3/0423; G06F 3/0416;
(Continued)

(56) References Cited

U.S. PATENT DOCUMENTS 5,919,802 A     7/1999   Jacobs et al.
6,429,856 B1 *  8/2002   Omura et al. ................ 345/175
(Continued)

FOREIGN PATENT DOCUMENTS

CN   101609383 A   12/2009
CN   201629785 U   11/2010
(Continued)

OTHER PUBLICATIONS

Office Action issued in corresponding Chinese application No. 201110421598.8 dated Nov. 4, 2015 and its English Translation.
(Continued)

*Primary Examiner* — Patrick N Edouard
*Assistant Examiner* — Joseph P Fox
(74) *Attorney, Agent, or Firm* — Haug Partners LLP; William S. Frommer

(57) ABSTRACT

An information processing apparatus includes a display panel, a frame, a touch sensor, and a controller. The display panel includes a display surface of a predetermined display area. The frame includes a frame surface that surrounds the display panel and determines the display area. The touch sensor is configured to detect touches to the display surface and the frame surface. The controller is configured to execute predetermined processing when a touch to a first area on the display surface is detected, and to execute the predetermined processing when a touch to a second area on the frame surface is detected, the second area being adjacent to the first area.

8 Claims, 17 Drawing Sheets

(51) Int. Cl.
*G06F 3/0488* (2013.01)
*G06F 3/042* (2006.01)

(58) Field of Classification Search
CPC .... G06F 1/1601; G06F 3/0488; G06F 3/0428; G06F 2203/0339
USPC .................................................. 345/173–178
See application file for complete search history.

(56) References Cited

U.S. PATENT DOCUMENTS

| | | | |
|---|---|---|---|
| 7,304,638 B2 * | 12/2007 | Murphy | 345/173 |
| 8,089,778 B2 * | 1/2012 | Wang et al. | 361/796 |
| 2004/0012572 A1 * | 1/2004 | Sowden et al. | 345/173 |
| 2006/0238517 A1 * | 10/2006 | King et al. | 345/173 |
| 2007/0018967 A1 * | 1/2007 | Wang et al. | 345/173 |
| 2007/0165006 A1 | 7/2007 | Sato et al. | |
| 2007/0247434 A1 | 10/2007 | Cradick et al. | |
| 2009/0153438 A1 * | 6/2009 | Miller et al. | 345/55 |
| 2009/0178011 A1 * | 7/2009 | Ording | G06F 9/453 |
| | | | 715/863 |
| 2010/0075720 A1 * | 3/2010 | Lee et al. | 455/566 |
| 2010/0214249 A1 * | 8/2010 | Ikeda et al. | 345/173 |
| 2010/0245263 A1 | 9/2010 | Parada, Jr. et al. | |
| 2011/0047494 A1 * | 2/2011 | Chaine | G06F 3/0436 |
| | | | 715/769 |
| 2011/0074738 A1 * | 3/2011 | Ye | G06F 3/0428 |
| | | | 345/175 |
| 2011/0209088 A1 * | 8/2011 | Hinckley | G06F 3/0488 |
| | | | 715/810 |
| 2011/0209097 A1 * | 8/2011 | Hinckley | G06F 3/0483 |
| | | | 715/863 |
| 2011/0209099 A1 * | 8/2011 | Hinckley | G06F 3/0483 |
| | | | 715/863 |
| 2012/0032917 A1 * | 2/2012 | Yamaguchi | 345/174 |
| 2012/0113062 A1 * | 5/2012 | Briden | G06F 3/0304 |
| | | | 345/175 |

FOREIGN PATENT DOCUMENTS

| | | | |
|---|---|---|---|
| EP | 0680007 | A1 | 11/1995 |
| EP | 2003538 | A1 | 12/2008 |
| JP | 6-95803 | | 4/1994 |
| JP | 2002-57086 | A | 2/2002 |
| JP | 2002-140141 | | 5/2002 |
| JP | 2002-157086 | | 5/2002 |
| JP | 2004-355593 | | 12/2004 |
| JP | 2008-158911 | | 7/2008 |
| JP | 2009-42993 | | 2/2009 |
| TW | 527823 | W | 4/2003 |
| WO | WO 2007/103631 | A2 | 9/2007 |
| WO | 2009092599 | A1 | 7/2009 |
| WO | WO 2009/092599 | | 7/2009 |
| WO | WO 2010/110683 | | 9/2010 |
| WO | WO 2010126072 | A1 * | 11/2010 |

OTHER PUBLICATIONS

Search Report issued in corresponding European Application No. 11186164.7 dated Jan. 22, 2016.
Office Action issued in corresponding Chinese Application No. 201110421598.8 dated Aug. 15, 2016.
European Search Report dated Oct. 30, 2018.

* cited by examiner

INFORMATION PROCESSING APPARATUS AND INFORMATION PROCESSING METHOD

BACKGROUND

The present disclosure relates to an information processing apparatus that enables touch operations to be made, and to an information processing method in such an information processing apparatus.

In recent years, an information processing apparatus such as a PC (Personal Computer) tends to install a touch panel. In general, a display area and a touch operation valid area correspond to each other in this touch panel. However, when a small icon or the like is displayed in the corner of the display area, a touch operation by the user may be difficult because a frame surrounding the display area of the display apparatus becomes obstacle and a contact range of the finger is larger than the size of the icon, for example.

Related to such a problem, Japanese Patent Application Laid-open No. 2004-355593 (hereinafter, referred to as Patent Document 1) discloses a touch panel that facilitates touch inputs to the peripheral portion of a display screen by setting a touch input valid area to be larger than the display screen.

Further, each of US Patent Application No. 2006/0238517 and U.S. Pat. No. 5,919,802 (hereinafter, referred to as Patent Documents 2 and 3) discloses a portable device that enables touch operations to be made in not only a display but also a bezel and border area surrounding it.

SUMMARY

However, even if according to the technique disclosed in the above-mentioned Patent Document 1, the frame surrounding the display screen is not obstacle any more, as long as the icon displayed in the corner of the display screen has a size significantly smaller than the contact area of the user's finger, for example, it is still difficult for the user to correctly touch the position of the icon.

Further, in the techniques disclosed in the above-mentioned Patent Documents 2 and 3, functions different from functions that can be executed by touch operations with respect to the display are assigned to the bezel and border area, and it may be impossible to assist operations with respect to the touch operation target displayed on the display.

In view of the above-mentioned circumstances, there is a need for providing an information processing apparatus and an information processing method, which can improve touch operability by extending an operation range with respect to a touch operation target displayed on a display area beyond the display area.

According to an embodiment of the present disclosure, there is provided an information processing apparatus including a display panel, a frame, a touch sensor, and a controller. The display panel includes a display surface of a predetermined display area. The frame includes a frame surface that surrounds the display panel and determines the display area. The touch sensor is configured to detect touches to the display surface and the frame surface. The controller is configured to execute predetermined processing when a touch to a first area on the display surface is detected, and to execute the predetermined processing when a touch to a second area on the frame surface is detected, the second area being adjacent to the first area.

With this configuration, the information processing apparatus can improve touch operability by extending an operation range with respect to a touch operation target displayed on the display surface beyond the display area. The predetermined processing means an operation of closing a window, for example.

The information processing apparatus may further include an output unit configured to output, when the touch to the second area is detected, information indicating detection of the touch.

The frame is incapable of providing, by itself, the user with a feedback about a touch unlike an icon and the like displayed on the display panel, for example. However, with the above-mentioned configuration, the information processing apparatus can provide a feedback about a touch to the frame.

The controller may control, when the touch to the second area is detected, the output unit to display on the display panel a predetermined animation indicating detection of the touch.

With this, the information processing apparatus can visually provide a feedback about a touch to the frame.

In this' case, the controller may control the output unit so that the animation becomes gradually larger with a position of the touch in the second area being a center.

With this, the information processing apparatus can easily inform the user which position the user has actually touched on the frame.

The output unit may include a speaker. In this case, the controller may control, when the touch to the second area is detected, the output unit to output through the speaker a predetermined sound indicating detection of the touch.

With this, the information processing apparatus can acoustically provide a feedback about a touch to the frame.

The information processing apparatus may further include a glass plate that is provided to integrally cover the frame surface and the display surface.

With this, the information processing apparatus can realize a flush surface screen by use of the glass plate, to thereby prevent the user from recognizing whether the user touches the first area or the second area.

In this case, the glass plate may include one of printed information and carved information indicating content of the predetermined processing at a position corresponding to the second area in one of a front surface and a back surface of the glass plate.

With this, the information processing apparatus can cause the user to easily understand that the predetermined processing to be executed by the touch to the first area can be also executed by the touch to the second area.

According to another embodiment of the present disclosure, there is provided an information processing method in an information processing apparatus including a display panel, a frame, and a touch sensor, the display panel including a display surface of a predetermined display area, the frame including a frame surface that surrounds the display panel and determines the display area. In this information processing method, touches to the display surface and the frame surface are detected by the touch sensor. When a touch to a first area on the display surface is detected, predetermined processing is executed. Further, also when a touch to a second area on the frame surface is detected, the predetermined processing is executed, the second area being adjacent to the first area.

As mentioned above, according to the embodiments of the present disclosure, it is possible to improve touch operability by extending the operation range with respect to the touch operation target displayed on the display area beyond the display area.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
[Outer Appearance and Inner Structure of PC]

Figure 1:
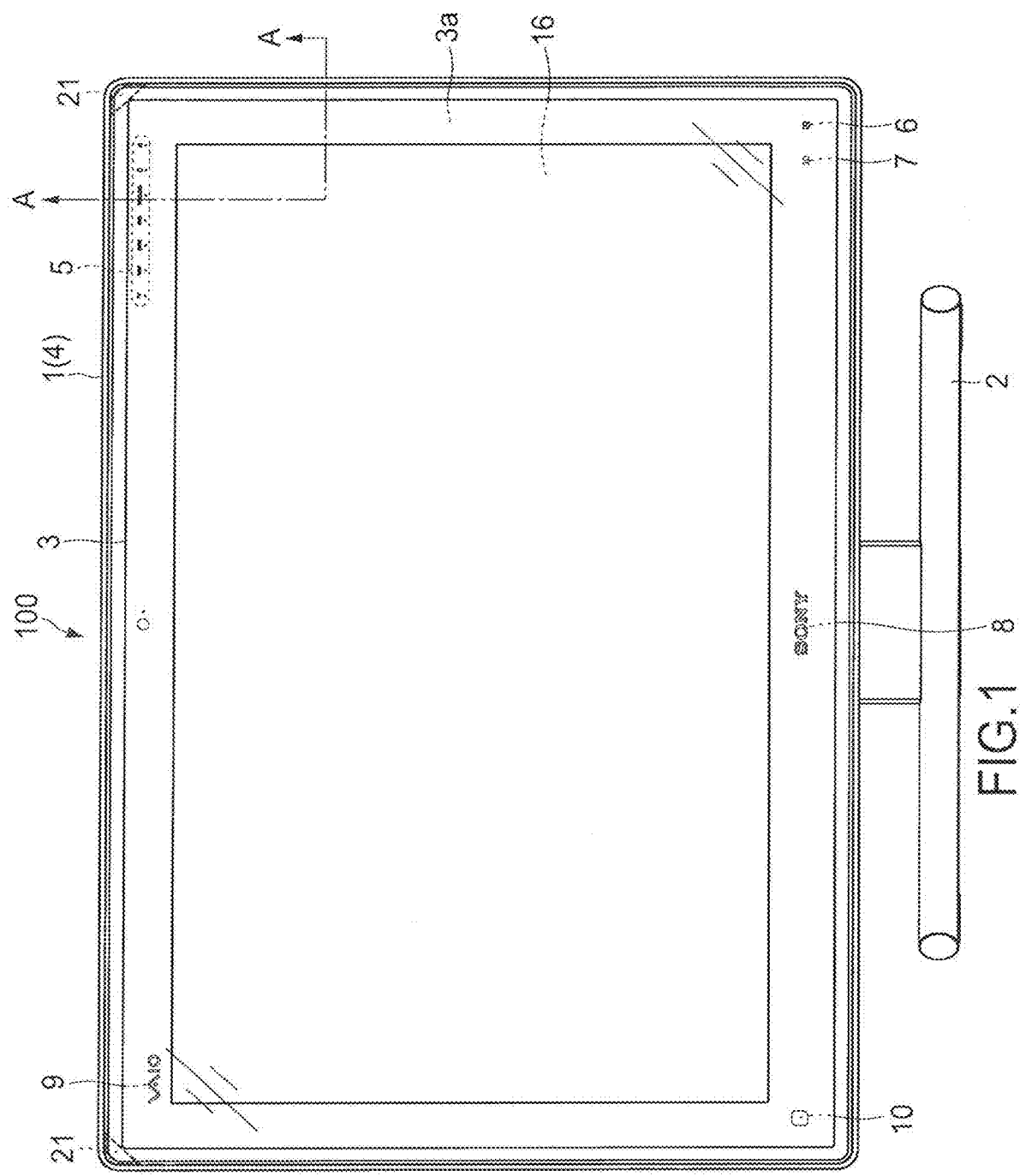
FIG. 1 is a front view showing an outer appearance of a PC according to an embodiment of the present disclosure.

FIG. 1 is a front view showing an outer appearance of a PC according to an embodiment of the present disclosure.

Figure 2:
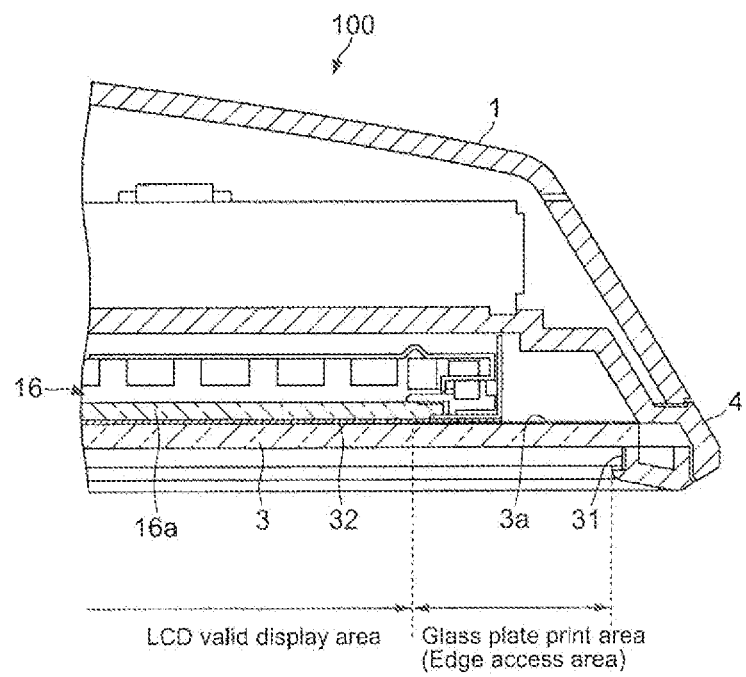
FIG. 2 is a partial sectional view taken from the A-A line of the PC of FIG. 1.

Further, FIG. 2 is a partial sectional view of the PC shown in FIG. 1, which is taken from the line A-A.

As shown in the drawings, the PC 100 includes a casing 1 and a stand 2. The casing 1 is provided with an LCD (Liquid Crystal Display) 16 and a frame 4 that supports the LCD 16 around the LCD 16. The PC 100 is a display-integrated type PC including the casing 1 that houses an HDD (Hard Disk Drive) as well as a motherboard.

On the LCD 16, a glass plate 3 is bonded. As shown in FIG. 2, the glass plate 3 has a display area larger than a valid display area of the LCD 16. In the periphery of the back surface of the glass plate 3, an opaque print area 3a is formed to have a frame shape. This print area 3a determines the valid display area of the LCD 16. Although the color of the print area 3a is, for example, black, various color variations are possible. Further, it is not limited to a single color, and various patterns may be applied by printing.

Further, as shown in FIG. 1, in the inside of the upper right and left ends of the frame 4, there are provided cameras 21 for an optical touch sensor unit. Each of the cameras 21 is one that includes an infrared emitter and a receiver, which are integrally formed. Further, as shown in FIG. 2, on inner surfaces of the frame 4, which correspond to three sides of the right, left, and lower sides of the glass plate 3, a light retroreflective tape 31 that reflects infrared rays emitted from the infrared emitters is bonded. The light retroreflective tape 31 contains, within its film, glass beads or the like, and includes constant perpendicular surfaces with respect to the light in any direction. Thus, the infrared rays emitted from the infrared emitters are reflected by the light retroreflective tape 31 toward the cameras 21 and received by the receivers. When the user touches the glass plate 3 with the finger, the infrared rays emitted from the infrared emitters are not received by the receivers, and detected as the shadow of the finger. Based on the position of this shadow, the touch position is calculated using the triangulation principle. Further, by this processing, the optical touch sensor unit can also perform a multi-touch detection. The optical touch sensor unit will be described later in detail.

The optical touch sensor unit can detect touches by the user over the glass plate 3. Therefore, a touch operation valid area exists in not only the LCD 16 but also the print area 3a surrounding it. In this embodiment, a function for enabling the touch operations to be made in the print area 3a is referred to as edge access function, and the print area 3a is also referred to as edge access area.

As shown in FIG. 1, in the upper right of the print area 3a, there is, for example, printed a group of status displays 5 that display statuses including a TV mode, an HDMI (High-Definition Multimedia Interface) mode, a video mode, a web mode, a wireless mode, turning ON/OFF, and the like. In the lower right of the print area 3a, an edge access setting button 6 and a 3D mode status display 7 are printed. In the lower left of the print area 3a, a desktop/window switch button 10 is printed. In the lower center and upper left of the print area 3a, trademark logos 8, 9 are printed. Among them, the edge access setting button 6, the trademark logos 8, 9, and the desktop/window switch button 10 become edge access function targets. That is, by touching those buttons and logos, the user can cause the PC 100 to execute various functions. The edge access function will be described later in detail.

Figures 3A, 3B:
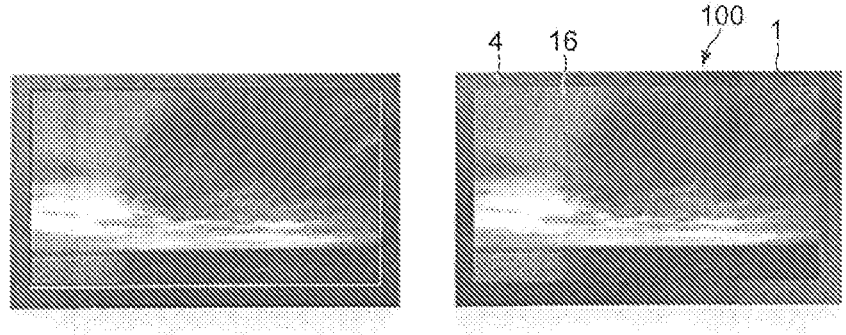
FIG. 3 are views showing an effect of bonding processing of a glass plate and an LCD in the PC.

As shown in FIG. 2, a display panel 16a of the LCD 16 and the glass plate 3 are bonded, for example, by filling a gap between them with a bonding resin such as a transparent UV resin. FIG. 3 are views showing an effect of this bonding technique. FIG. 3A shows the front of a traditional PC filled with the air instead of the bonding resin, and FIG. 3B shows the front of the PC 100 according to this embodiment. As shown in the figure, the gap between the LCD 16 and the glass plate 3 is filled with the bonding resin instead of the air layer, and hence the external light can be prevented from diffusely reflecting due to the air layer, and it looks like the image was embossed onto the glass plate 3. Thus, for the user, a user interface displayed on the LCD 16 will be provided in the front surface of the glass plate 3 together with the edge access function.

In this embodiment, the glass plate 3 covers a range larger than the valid display area of the LCD 16. Thus, in the front surface of the PC 100, except for the protruding edge of the frame, a so-called flush surface design is realized.

Further, in a PC including an optical touch panel, the above-mentioned light retroreflective tape is provided in the inner surfaces of the frame, and hence a step is necessarily formed between the glass plate and the frame. In the traditional PC, the position of the step substantially corresponds to the ends of the valid display area of the LCD and the glass plate. Therefore, the step makes a shadow on the screen of the LCD. This becomes a very annoying element during viewing a film and a TV.

Further, as described above, the light retroreflective tape has constant perpendicular surfaces with respect to the light in any direction, and hence, for example, waved mirror images of a fluorescent light and the like can be seen in the tape and fall in the LCD, which becomes an annoying element as in the above description.

However, when the flush surface design as in this embodiment is realized and the print area 3a is formed, the shadow and the like are absorbed in the print area 3a and not recognized by the user with the eyes. Thus, the above-mentioned annoying elements are overcome.

Further, in the PC including the traditional optical touch panel, for the purpose of suppressing reflection of the infrared rays emitted from the cameras, the frame surrounding the glass plate is typically processed to be matte black. However, in this embodiment, the print area 3a is formed in the back surface of the glass plate 3 and spaced away from the area, through which the infrared rays pass, in a thickness direction by the thickness of the glass plate 3 (approximately 2 to 2.5 mm). Therefore, the print area 3a is less likely to be affected by the reflection. Thus, using the print area 3a, the PC 100 having a variety of colors can be realized.

In addition, the print area 3a can be also used for changing the valid display area of the LCD 16. FIG. 4 are views showing a state in which the size of the valid display area of the LCD 16 is changed due to the difference of the size of the print area 3a.

Figure 4A:
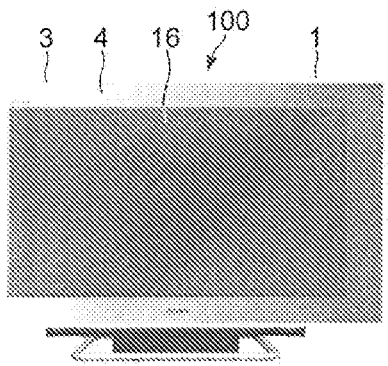
FIG. 4 are views showing a state in which the size of a valid display area of the LCD is changed due to the difference of the size of a print area in the PC.
Figure 4B:
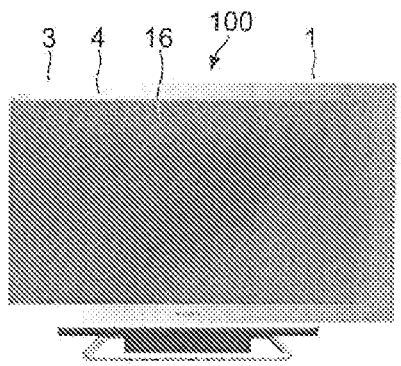

As shown in FIGS. 4A and 4B, by changing the area of the print area 3a, a model of the LCD 16, which has a different inch size, can be manufactured without changing the size of the casing 1. Since the size of the casing 1 is not changed even when the inch size of the LCD 16 is changed, many parts are shared. Further, regarding software that realizes the edge access function, by preparing coordinate tables of different function definitions depending on the inch sizes and switching them, it can be also shared.

Figure 5A:
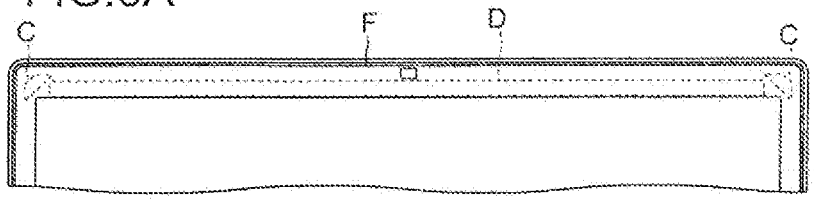
FIG. 5 are views showing a structure of an upper portion of the PC in comparison with a traditional PC.
Figure 5B:
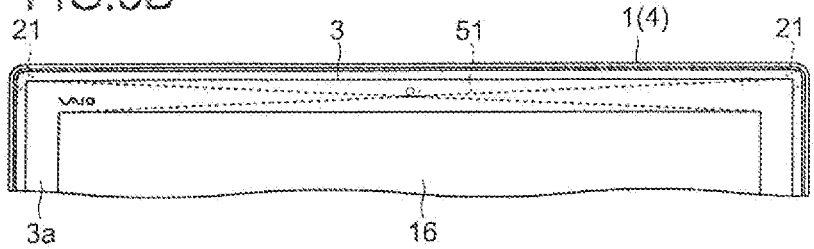

FIG. 5 are views showing the upper portion of the PC 100 in comparison with the traditional PC including the optical touch panel. FIG. 5A shows the upper portion of the traditional PC and FIG. 5B shows the upper portion of the PC 100 of this embodiment. As shown in FIG. 5A, in the traditional PC, infrared rays emitted from two cameras C pass through the inside of a front panel of a frame F, and hence it may be impossible to provide a structure that blocks out the infrared rays in an area D in the inside of the front panel. Therefore, a cavity is formed in the inside of the front panel, and the front panel can be deflected when the user holds the front panel with the hand, for example, which becomes a problem in terms of rigidity. However, as shown in FIG. 5B, in the PC 100 according to this embodiment, two cameras 21 are arranged sufficiently above the valid display area of the LCD 16, and hence the light beams emitted from the cameras 21 directly pass through the glass plate 3 without passing though the inside of the frame 4. Thus, in this embodiment, in the upper portion of the frame 4 and on the back of the glass plate 3, support ribs 51 are provided. With this, the rigidity is ensured.

Figure 6A:
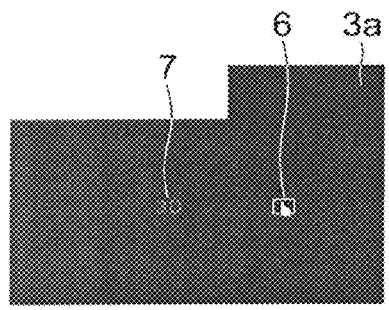
FIG. 6 are views showing status displays by printing in the print area of the PC.
Figure 6B:
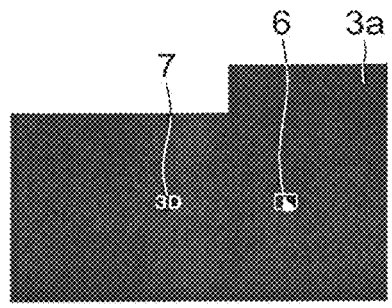
Figure 6C:
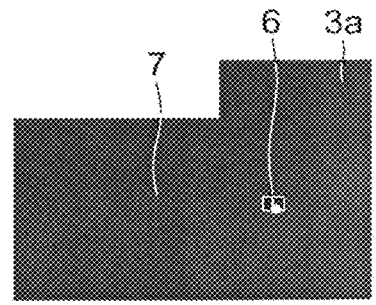

In the print area 3a, various status displays can be made by employing various types of printing processing. FIGS. 6 and 7 are views showing status displays by this printing. As shown in FIG. 6, the edge access setting button 6 and the 3D mode status display 7 are formed by outlining and printing characters on the black background of the print area 3a. By providing LEDs (Light-Emitting Diodes) on the back of those buttons and status displays, a feedback of the statuses can be easily realized. In addition, those characters are formed by medium printing processing, and hence it becomes also possible to hide the characters from view by turning ON/OFF the LEDs. For example, as shown in FIGS. 6A, 6B, and 6C, the 3D mode status display 7 can be expressed in three statuses of a disabled state, stand-by state, and actuation state.

Figure 7A:
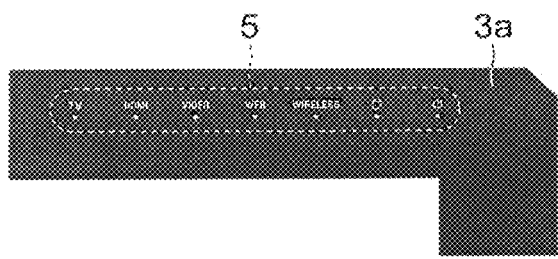
FIG. 7 are views showing status displays by printing in the print area of the PC.
Figure 7B:
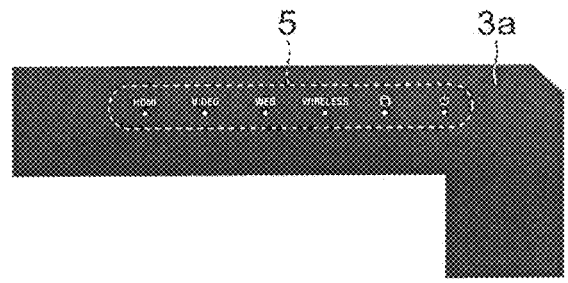

Further, as shown in FIG. 7, existence or absence of various functions of the PC 100 can be expressed only by printing processing with respect to the print area 3a. For example, regarding a TV tuner function in the PC 100, existence of that function is expressed by printing in FIG. 7A. In FIG. 7B, by using a printing plate without a portion corresponding to that function, absence of that function is expressed without changing other hardware components.

[Hardware Configuration of PC]

Figure 8:
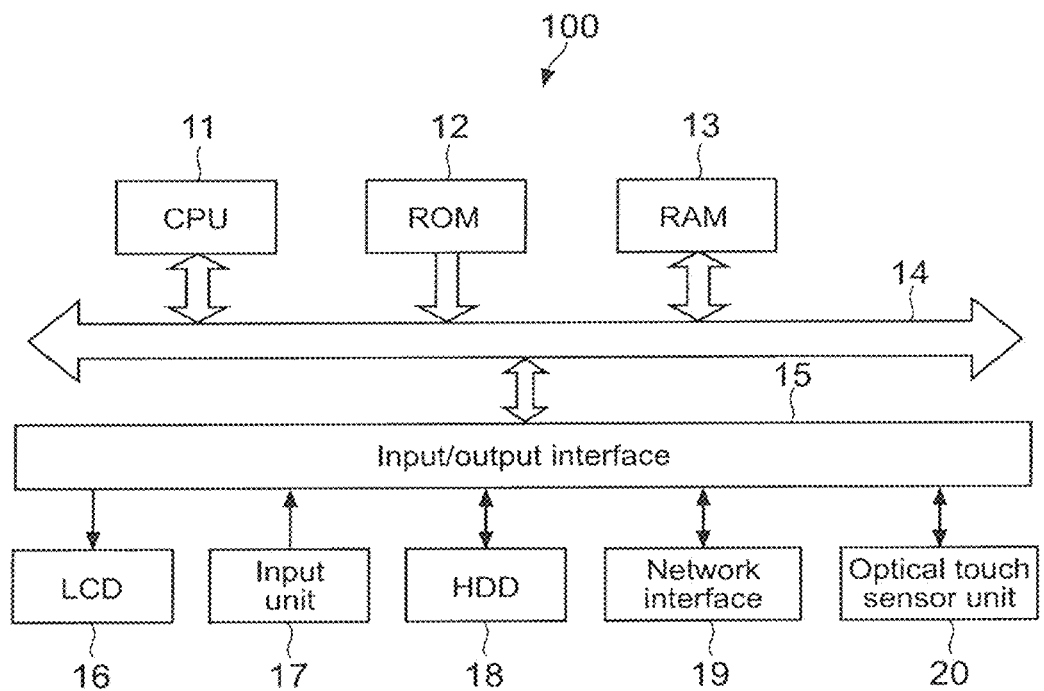
FIG. 8 is a block diagram showing a hardware configuration of the PC.

FIG. 8 is a block diagram showing a hardware configuration of the PC 100. As shown in the drawing, the PC 100 includes a CPU (Central Processing Unit) 11, a ROM (Read Only Memory) 12, a RAM (Random Access Memory) 13, an input/output interface 15, and a bus 14 that connects them to each other.

The CPU 11 appropriately access the RAM 13 or the like depending on needs, and performs various types of arithmetic processing to generally control the respective blocks of the PC 100. The ROM 12 is a non-volatile memory in which an OS and various types of firmware such as programs and various parameters are fixedly stored, which are executed by the CPU 11. The RAM 13 is used as a work area or the like of the CPU 11 to temporarily hold the OS, executed various applications, and various types of processed data.

To the input/output interface 15, the LCD 16, the input unit 17, an HDD 18, a network interface 19, an optical touch sensor unit 20, and the like are connected. Further, although not shown in the drawing, to the input/output interface 15, a speaker that outputs sound is also connected.

The LCD 16 displays screens of the various applications, video of content, and the like. Instead of the LCD 16, another device such as a plasma display or an OELD (Organic Electro-Luminescence Display) may be used.

The input unit 17 includes, for example, pointing devices such as a mouse, a keyboard, switches, and other operating apparatuses.

The HDD 18 is, for example, anon-volatile memory such as an HDD, a flash memory, or another solid-state memory. In the HDD 18, the OS, various applications, and various types of data are stored. In particular, in this embodiment, in the HDD 18, applications, data, and the like necessary for executing the edge access function are also stored.

The network interface 19 is a NIC (Network Interface Card) or the like for connection to the Internet or a network such as a LAN (Local Area Network). The network interface 19 may communicate in a wired or wireless manner.

Figure 9:
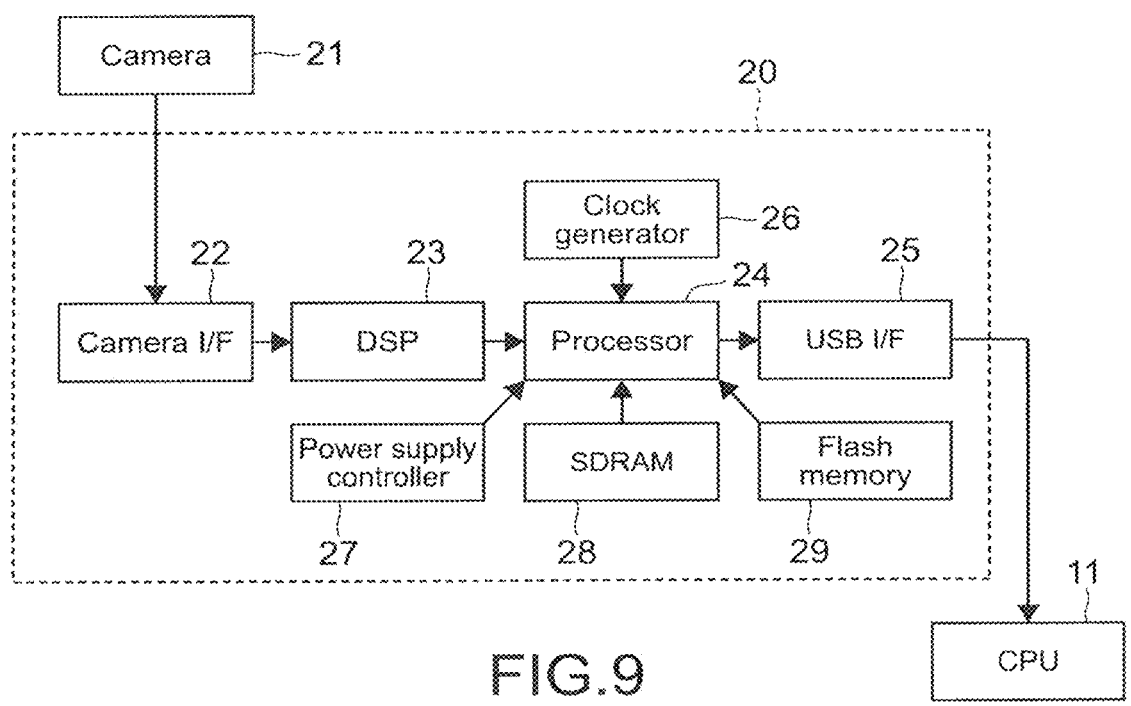
FIG. 9 is a block diagram showing a configuration of an optical touch sensor unit of the PC.

As described above, the optical touch sensor unit 20 detects a touch to the glass plate 3 by the user and transmits it to the CPU 11. FIG. 9 is a block diagram showing a configuration of the optical touch sensor unit 20.

As shown in the drawing, the optical touch sensor unit 20 includes, in addition to the above-mentioned cameras 21, a camera interface (I/F) 22, a DSP (Digital Signal Processor) 23, a processor 24, a USB (Universal Serial Bus) interface (I/F) 25, a clock generator 26, a power supply controller 27, an SDRAM (Synchronous DRAM) 28, and a flash memory 29.

When the cameras 21 detect the above-mentioned shadow, information thereof is transmitted via the DSP 23 to the processor 24. The processor 24 calculates, appropriately in cooperation with the clock generator 26, the power supply controller 27, the SDRAM 28, and the flash memory 29, a touch position using the triangulation, and transmits, via the USB interface 25, the calculation result to the CPU 11.

[Valid Area Definition of Edge Access Function]

Figure 10:
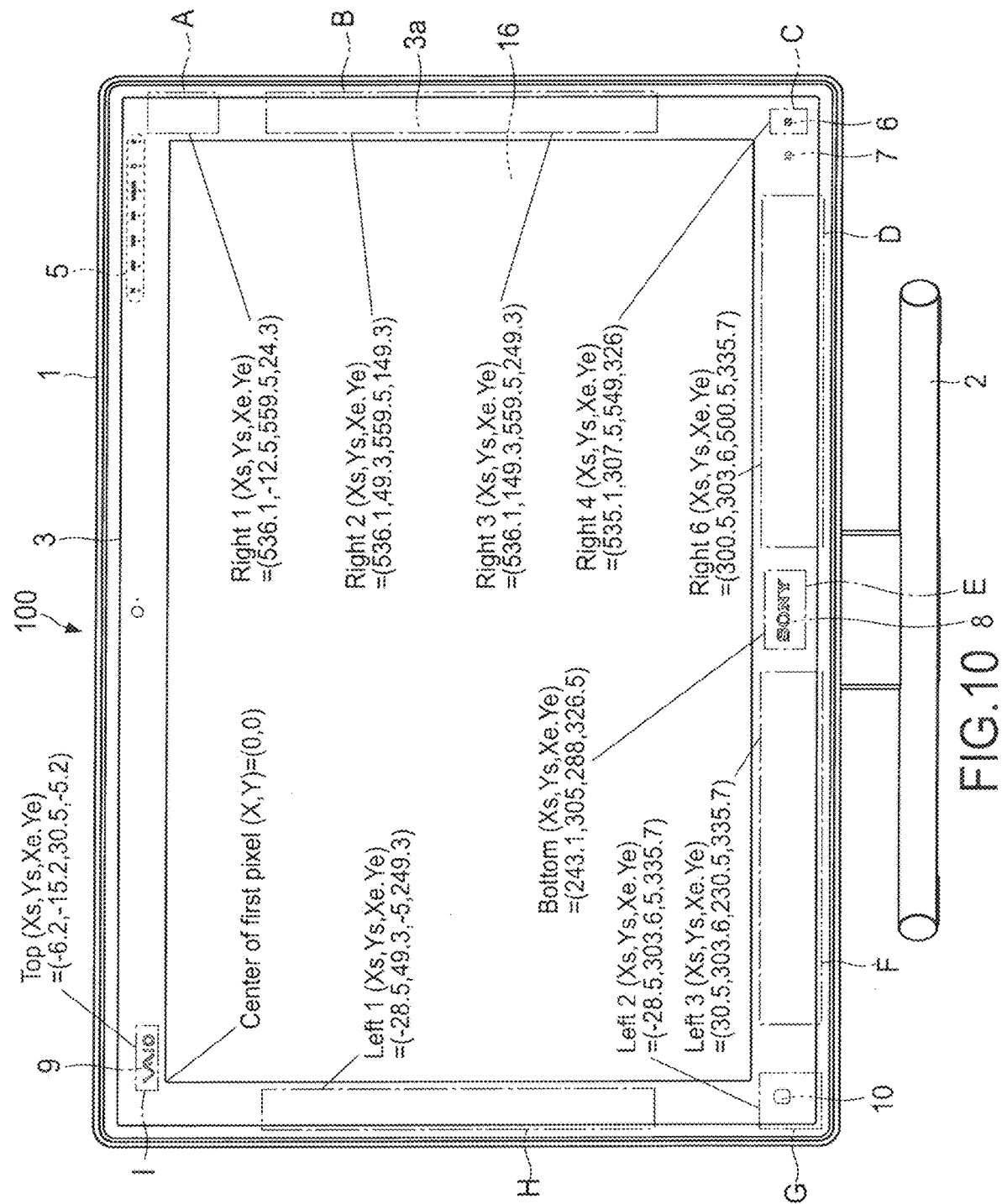
FIG. 10 is a view showing valid areas of an edge access function in the PC.

FIG. 10 is a view showing a valid area definition of the edge access function. As shown in the drawing, in this embodiment, different functions are assigned to areas A to I shown by the alternate long and short dash lines. The areas are defined by coordinate systems with the upper left end of the valid display area of the LCD 16 being an origin (0,0). Here, the areas are defined to have an extra size of about 3 mm up to a virtual position outside the edges of the frame. With this, it is possible to absorb a variation in components and dimension during manufacturing. Further, in the edge access function, certain operation target areas include no intentional indication by printing or the like, and hence those areas are set to have a relatively large range.

Further, regarding the areas of the trademark logos 9 and 8, not logo print portions but only areas surrounding them are defined as reaction portions. Further, those areas are set to be larger in upper and lower directions as compared to left- and right-hand directions. That is because it is assumed that the edge access function is basically operated by the finger of the user, the operation by the finger causes a larger error in the upper and lower directions as compared to the left- and right-hand directions, and it is desirable that the characters of the logo be not hidden by the finger during the operation by the user. For example, the reaction area surrounding the logo is set to have a range of from the end of the logo to 5 mm in the left- and right-hand directions and 8 mm in the upper and lower directions.

Further, in the PC 100, a plurality of applications (or utility software) are executed, and hence functions assigned to the areas A to I may be different depending on the plurality of applications. That is, the PC 100 includes a corresponding database of functions (key codes) assigned to the areas and applications in the HDD 18 or the like, and can switch the key codes assigned to the areas A to I depending on a currently highlighted application. In general, as the GUIs of the applications, there are a GUI that can be operated based on an amount of relative movement as in the mouse or touch pad and a GUI that can be operated by up, down, left, and right cursors as in the remote controller. If a different interface is used for each application, the user is confused in many cases. However, in this embodiment, as described above, by the PC 100 switching the key codes in its inside, the user can perform an intuitive operation without conscious effort.

To the area A in the upper right of the print area 3$a$, a function of closing windows of the various applications is assigned. Although the close button for the windows of the various applications is often displayed in the upper right end portion of the LCD 16, the size of the close button becomes smaller particularly in a high resolution LCD and the user may not touch it correctly. In particular, in the optical touch panel, as will be described later, the area of the upper portion of the LCD 16 has the lowest detection accuracy among the other areas in many cases. That is because although the optical touch panel is generally designed in assumption that the finger has a size of about $\varphi 5$ mm, there is no limitation on screen size, resolution, application design, and the like in a generally used OS such as Windows (registered trademark), and hence in an actual touch panel product, it may be beyond the hardware performance.

In view of this, in this embodiment, also when in addition to the close button displayed on the LCD 16, the area A adjacent thereto is touched, the window can be closed. That is, the operation target area for the function of closing the window is extended up to the print area 3$a$ located outside the LCD 16, to thereby support the operation by the user.

To the area B having a rectangular shape long in a longitudinal direction, which is located in the right center of the print area 3$a$, an enlargement/reduction function for various types of content displayed on the LCD 16 is assigned. When the user drags the finger on the area B upwardly or downwardly, a document or image displayed on the LCD 16 is enlarged (in the case of dragging it upwardly)/reduced in size (in the case of dragging it downwardly). More specifically, when the area B is touched during execution of a browser of Internet Explorer (registered trademark) or the like or a PDF viewer, a key code of [Ctrl]+[+/−] is transmitted to the application side. When the area B is touched during execution of Windows (registered trademark) Explorer, Microsoft Office (registered trademark), or the like, a key code of [Ctrl]+[Mouse Scroll Up/Down] is transmitted to the application side.

To the area C in the lower right of the print area 3$a$, as described above, the function of the edge access setting button 6 is assigned. When the area C is touched (tapped), an operation guide about the edge access function is displayed. When the area C is long-pressed (long-touched), a setting screen of the edge access function is displayed.

To the areas D and F having a rectangular shape long in a lateral direction, which are located in the lower portion of the print area 3$a$, a function of a "Next" button and a function of a "Back" button are assigned. When the area D is touched, the next page is displayed in the case of document content, and the next content is reproduced in the case of reproduction software of photograph, video, music, or the like. Similarly, when the area F is touched, the previous page is displayed in the case of the document content, and the previous content is reproduced in the case of the reproduction software of photograph, video, music, or the like. More specifically, when the area D or F is touched during execution of a browser, a key code of (Alt)+[←/→] is transmitted to the application side. When the area D or F is touched during execution of a TV or DVD reproduction application, a message of "To next chapter/To previous chapter" is transmitted to the application side.

To the area E of the lower center of the print area 3$a$, a function of switching automatic control/turning OFF of an LED lamp provided on the back of the trademark logo 8 is assigned. Every time the area E is touched, a mode of automatically controlling turning ON of the lamp of the logo and a mode of keeping the lamp OFF are switched.

To the area G of the lower left of the print area 3a, a function of the above-mentioned desktop/window switch button 10 is assigned. When the area G is touched (tapped), a desktop is displayed on the LCD 16. When it is long-pressed (long-touched), a window to be displayed on the LCD 16 is switched.

To the area H having a rectangular shape long in a longitudinal direction, which is located in the left center of the print area 3a, a function of displaying a screen keyboard on the LCD 16 is assigned.

To the area I (area of the trademark logo 9) in the upper left of the print area 3a, a function of activating a previously designated application is assigned. When the area I is touched (tapped), the application is activated. When it is long-pressed (long-touched), a screen for changing an application to be activated is displayed on the LCD 16.

In the HDD 18, the corresponding table of the coordinate positions of the areas A to I described above and the functions assigned thereto is stored. Every time the print area 3a is touched in a valid state of the edge access function, which will be described later, the table is referred to and each function is executed.

As mentioned above, the functions assigned to the areas can be classified into the following kinds.

1. Function difficult to be operated by a touch panel operation
2. Function that is compatible with the touch panel operation, but is located at a deep level in a hierarchy structure for actuation
3. Function that is frequently operated during the touch panel operation The example of Function 1 is the function of closing the window, which is assigned to the area A. A generally used window close button is, in many cases, made in assumption of an operation by the mouse and too small to be operated using the touch panel. However, as described above, by extending its operation range, operability for the user is improved.

The example of Function 2 is the function of turning ON/OFF the logos, which is assigned to the area E. In a typical OS, it is necessary for the user to reach a very deep level in the hierarchy structure in order to control such setting of turning ON/OFF, and hence it is difficult to intuitively perform the setting. However, by assigning such a function to the area E, intuitive control becomes possible by directly touching each of the logos. Further, the function of switching the desktop/window, which is assigned to the area G, is also applied in the example of Function 2. Typically, in Windows (registered trademark), a window can be selected by "Ctrl+Alt+Tab." However, it is necessary to press three keys at the same time, and hence it is hardly used in general. However, by realizing this as a shortcut on the touch panel, ease of use for the user can be significantly improved.

The example of Function 3 is the function of software keyboard activation, which is assigned to the area H. By facilitating start of use of such a particularly important function in the touch panel, operability of the touch panel is further improved. Further, in this embodiment, when the area H is touched, the software keyboard is set to appear from the left side of the LCD 16 correspondingly to the position of the area H. Thus, a more intuitive operation can be achieved.

Figure 11:
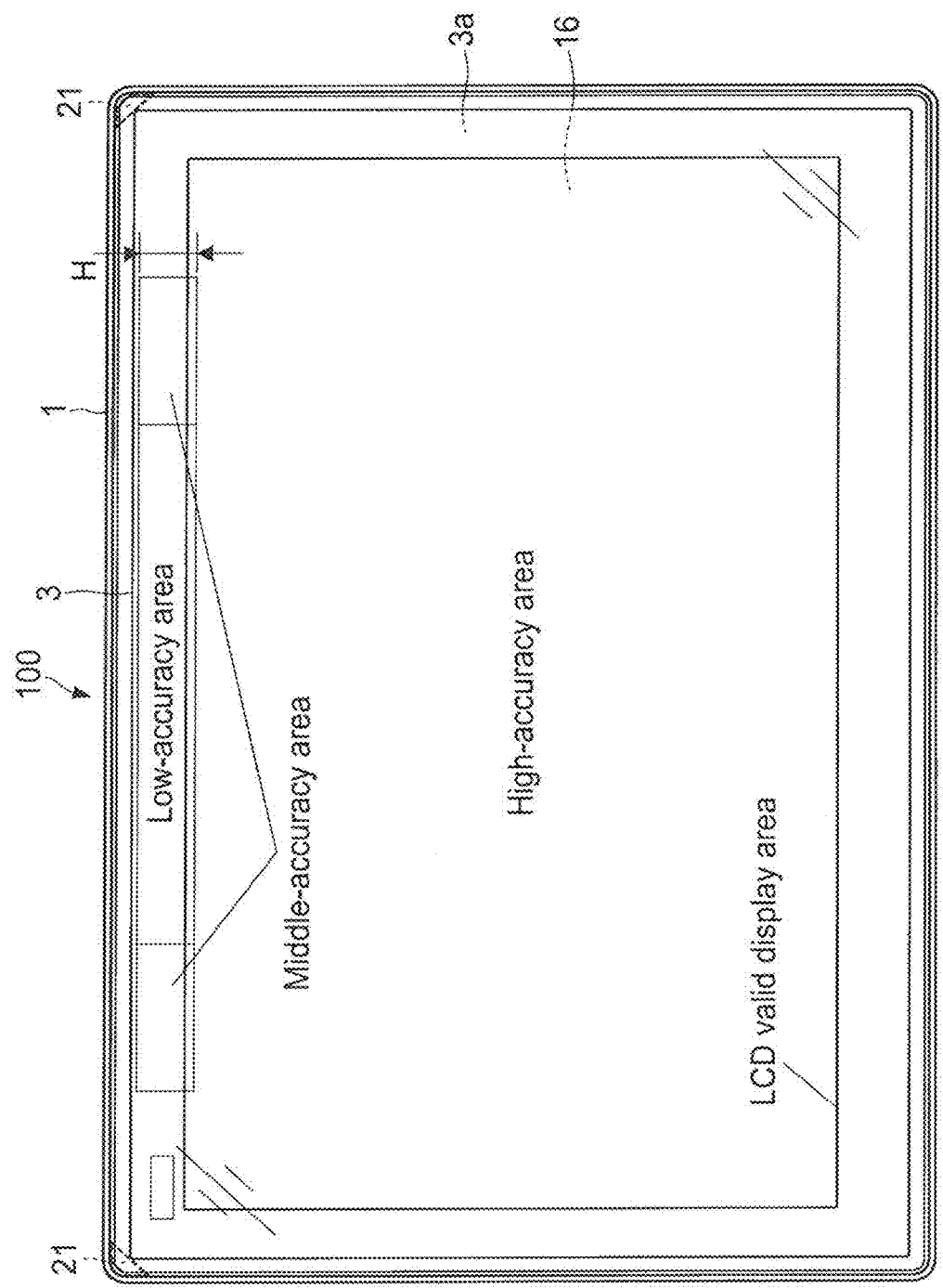
FIG. 11 is a view explaining detection accuracy of the optical touch sensor unit in the PC.

FIG. 11 is a view explaining detection accuracy of each area of the optical touch sensor in the above-mentioned PC. As described above, in this embodiment, two cameras 21 in total, each of which is integral with the infrared emitter, are located in the upper right and left of the frame 4. However, due to characteristics thereof, the upper center of the LCD 16 is a portion in which a signal level is at the minimum, that is, a portion in which touch operation detection accuracy is at the minimum. In view of this, in this embodiment, this low-accuracy area is not used, that is, no function is assigned to that area, and only middle-accuracy area and high-accuracy area are used instead, to thereby realize a high resolution device.

In general, in the optical touch panel, in an area (area of a length H in the longitudinal direction) of 6% of the upper portion of the screen in a longitudinal dimension is the low-accuracy area. Therefore, also in this embodiment, the active area is set to start from an area below such an area. For example, in the case where the glass plate 3 has a 27-inch size, the H is set to 20 mm. However, the H depends on arithmetic processing performance using the triangulation method and camera performance, the H is appropriately changed depending on them.

[Operation of PC]

Next, an operation in the PC 100 thus configured will be described. In the following, although the description will be made while considering the CPU 11 of the PC 100 as a main operating subject, the operation is performed in cooperation with other hardware and various types of software, which are executed under the control of the CPU 11.

(Initial Setting of Edge Access Function)

Figure 12:
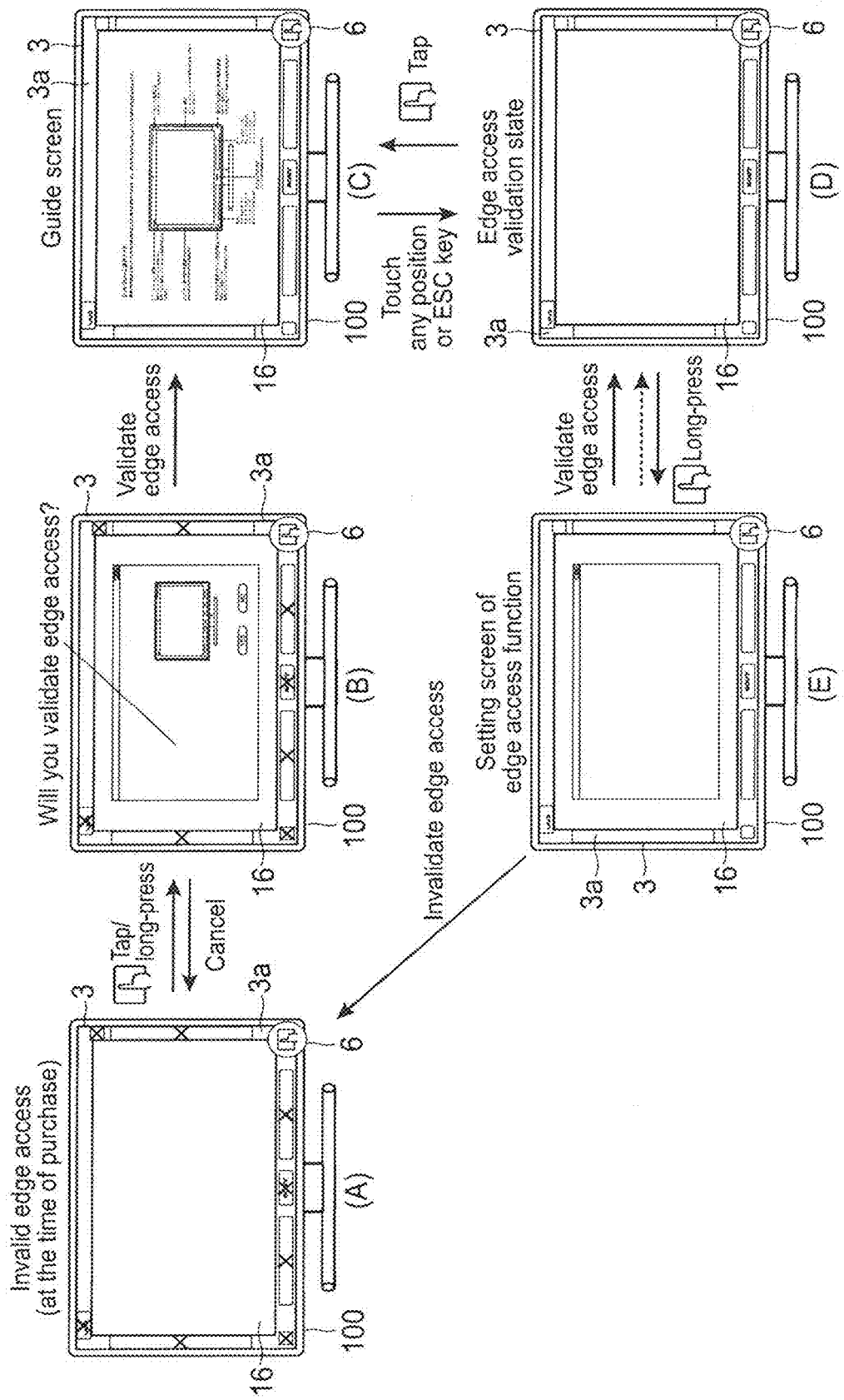
FIG. 12 is a view showing a flow during initial activation of the edge access function in the PC.

In the edge access function according to this embodiment, as described above, the certain functions do not have intentionally indicated positions, and hence it is necessary to cause the user to recognize relations between the positions and functions. For this purpose, the PC 100 is set to operate, only at the time of initial activation of the PC 100, differently from the following activation. FIG. 12 is a view showing a flow during the initial activation of the edge access function.

As shown in the part A of FIG. 12, at the time of purchase of the PC 100, the edge access function is invalid. By the user long-pressing any area in the print area 3a, a dialogue that causes the user to select whether or not to set the edge access function to be valid is displayed as shown in the part B of FIG. 12, and the user recognizes existence of the edge access function.

Figure 13:
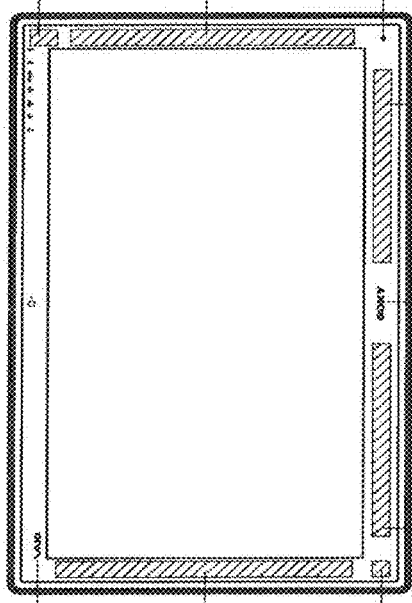
FIG. 13 is a view showing an operation guide screen of the edge access function in the PC.

When the user selects validation in such a dialogue, an operation guide screen of the edge access function is displayed as shown in the part C of FIG. 12. FIG. 13 is a view showing the operation guide screen. As shown in the drawing, in the operation guide screen, the same content as described above with reference to FIG. 8 is displayed. After this display, the user touches any area in the print area 3a, and then the edge access function is transitioned to a valid state as shown in the part D of FIG. 12. After transitioning to the valid state, the user taps the edge access setting button 6, and then the operation guide screen is displayed.

In this valid state, the user long-presses the edge access setting button 6, and then the setting screen of the edge access function is displayed as shown in the part E of FIG. 12. When invalidation of the edge access function is selected on the setting screen, it is transitioned to an invalid state as shown in the part A of FIG. 12. In this invalid state, the user long-presses the edge access setting button 6, the setting screen shown in the part E of FIG. 12 is displayed so that the edge access function can be placed in the valid state again on the screen.

(Execution of Edge Access Function)

Figure 14:
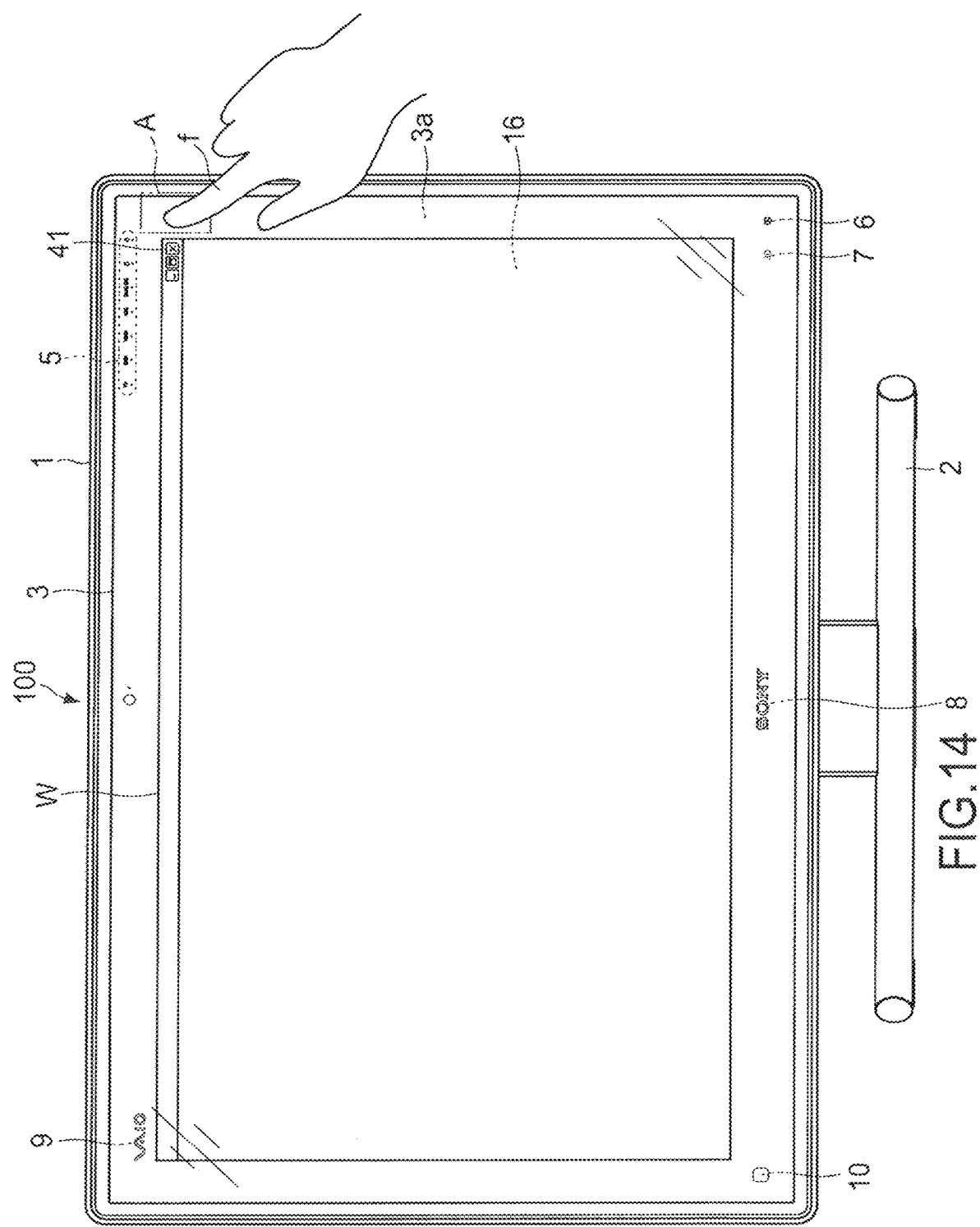
FIG. 14 is a view showing a state in which an area having the edge access function is touched in the PC.

Next, the operation of the edge access function in the valid state will be described. FIG. 14 is a view showing a state in which the area A is touched with a window W being displayed on the LCD 16. Further, FIG. 15 is a flowchart showing an operation flow of the CPU 11 when the print area 3a is touched.

Figure 15:
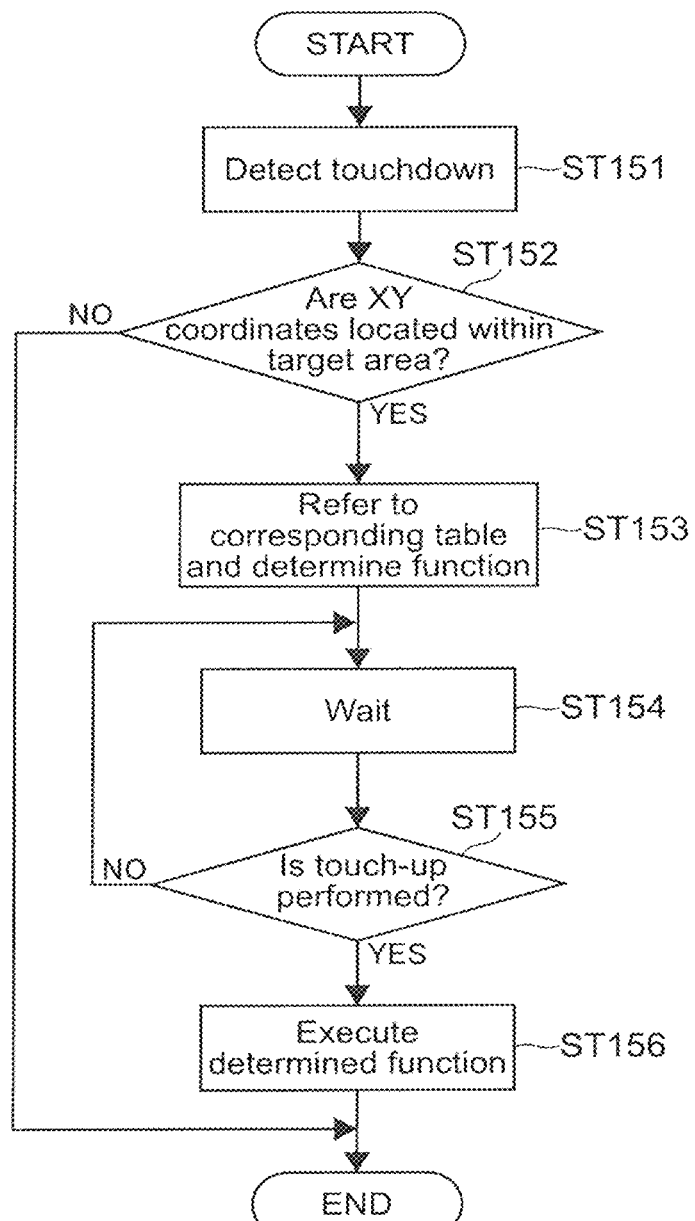
FIG. 15 is a flowchart showing an operation flow of the PC in the case of FIG. 14.

As shown in FIG. 15, the CPU 11 of the PC 100 detects a touchdown of a finger f with respect to the print area 3a (Step 151), and then determines whether or not XY coordinates of the touch area are located within the target area of the edge access function (Step 152).

When it is determined that the XY coordinates of the touch area are located within the target area of the edge access function (Yes), the CPU 11 reads the above-mentioned corresponding table and determines a function corresponding to such an area (function of closing the window in the case of FIG. 14) (Step 153).

Subsequently, the CPU 11 waits for a touch-up operation (Step 154). When detecting the touch-up operation (Yes in Step 155), the CPU 11 executes the determined function (Step 156).

On the other hand, when it is determined in Step 152 that the XY coordinates of the touch area are located outside the target area of the edge access function (No), the CPU 11 does not perform any processing with respect to the edge access function and terminates the flow. Here, when it is determined that the XY coordinates of the touch area are located at a position of a close button 41 on the LCD 16, the CPU 11 executes processing of closing the window W. Also regarding other areas on the LCD 16, the CPU 11 executes processing corresponding to each touch position in accordance with the user interface assigned for each application.

With this, as in the case where the close button 41 of the window W is touched, the CPU 11 can execute processing of closing the window W also when the area A adjacent thereto within the print area 3a is touched.

(Feedback Using Animation in Edge Access Function)

By the way, in the edge access function, as described above, the certain buttons do not have intentionally indicated positions, and hence a feedback to the user during actual touching is desirable. Further, although it is effective to show the feedback at the touch position, no screen that displays it exists in the print area 3a. In view of this, in this embodiment, the PC 100 is set to display an animation with the touch position being the center on the LCD 16.

Figure 16:
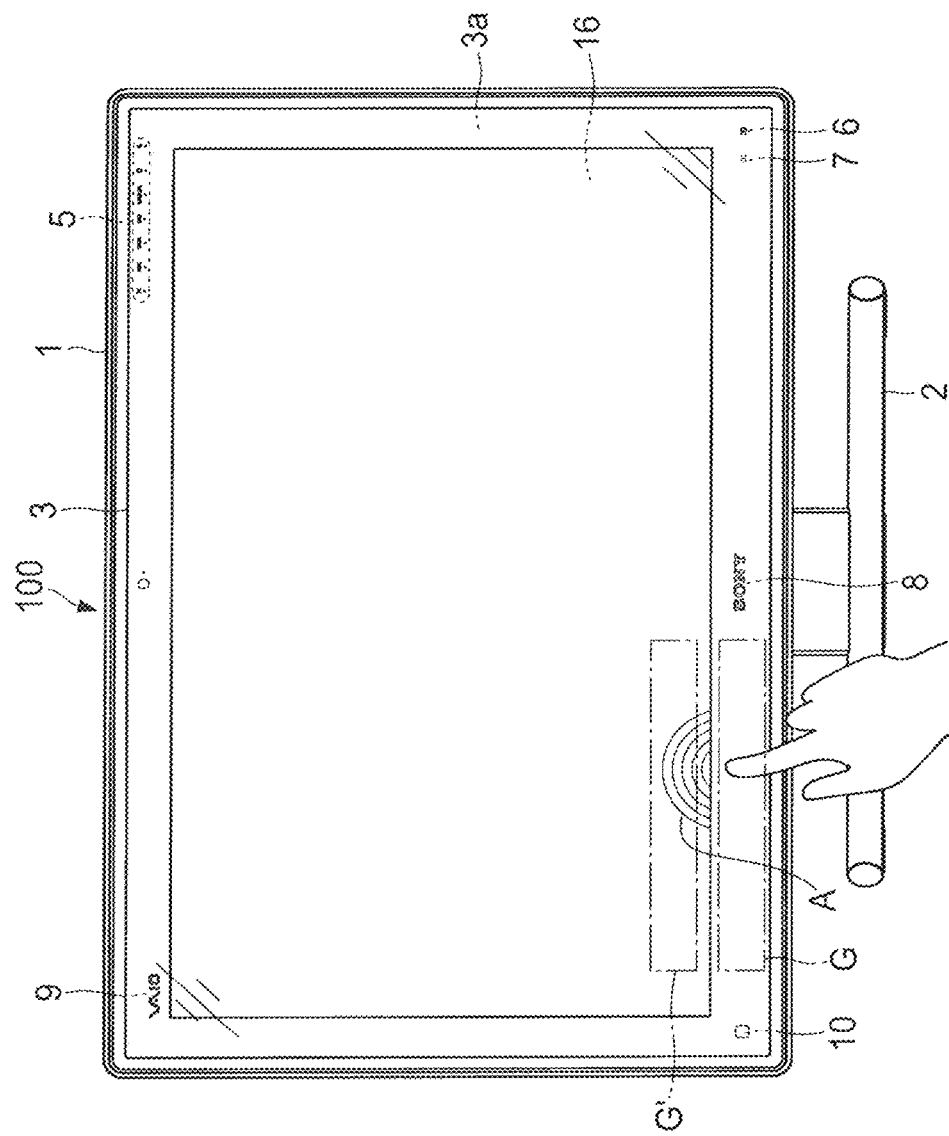
FIG. 16 is a view showing a state in which an animation is displayed when an area having the edge access function is touched in the PC.
Figure 17:
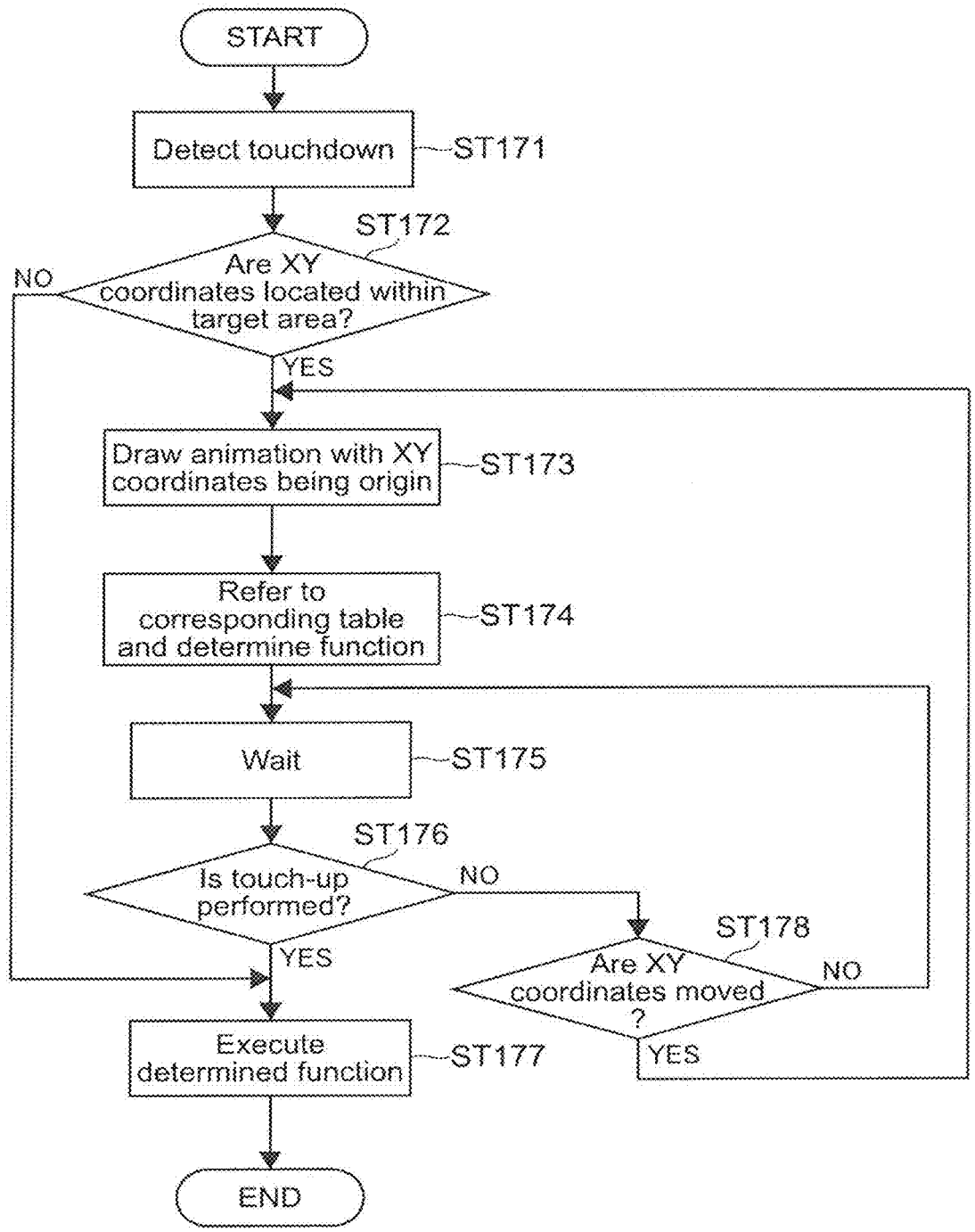
FIG. 17 is a flowchart showing an operation flow of the PC in the case of FIG. 16.

FIG. 16 is a view showing a state in which the area G is touched, and FIG. 17 is a flowchart showing an operation flow of the CPU 11 in this case.

Here, as shown in FIG. 16, although the function of returning a page to the previous page or reproducing the previous content is assigned to the area G as described above, such a function can be executed, in some applications, also in an area G' adjacent to the area G on the LCD 16, for example. For example, in a photograph display application or an electronic book reading application, the previous photograph or the previous page is displayed when the area G' on the LCD 16 is touched. Specifically, the PC 100 enables the "Back" function, which can be executed in the area G' on the LCD 16, to be executed also in the area G adjacent thereto on the print area 3a, such that the operation target range for executing such a function is extended.

As shown in FIG. 17, the CPU 11 detects a touchdown with respect to the print area 3a (Step 171), and then determines whether or not the XY coordinates of the touch area are located within the target area of the edge access function (Step 172).

When it is determined that the XY coordinates of the touch area are located within the target area of the edge access function (Yes), the CPU 11 draws a ripple-like animation A as shown in FIG. 16 with the XY coordinates of the touch position being an origin and displays it on the LCD 16 (Step 173).

Subsequently, the CPU 11 reads the corresponding table and determines a function corresponding to such an area (function of returning in the case of FIG. 16) (Step 174).

Subsequently, the CPU 11 waits for a touch-up operation (Step 175). When detecting the touch-up operation (Yes in Step 176), the CPU 11 executes the determined function (Step 177).

On the other hand, the touch-up is not detected in Step 176 and movement of the XY coordinates of the touch position is detected (Yes in Step 178), the CPU 11 returns to Step 173 and draws the above-mentioned ripple-like animation with the XY coordinates after the movement being an origin.

As described above, by displaying the ripple animation with the virtual point outside the valid display area of the LCD 16 being the center, the CPU 11 realizes a feedback easy for the user to understand.

Figure 18:
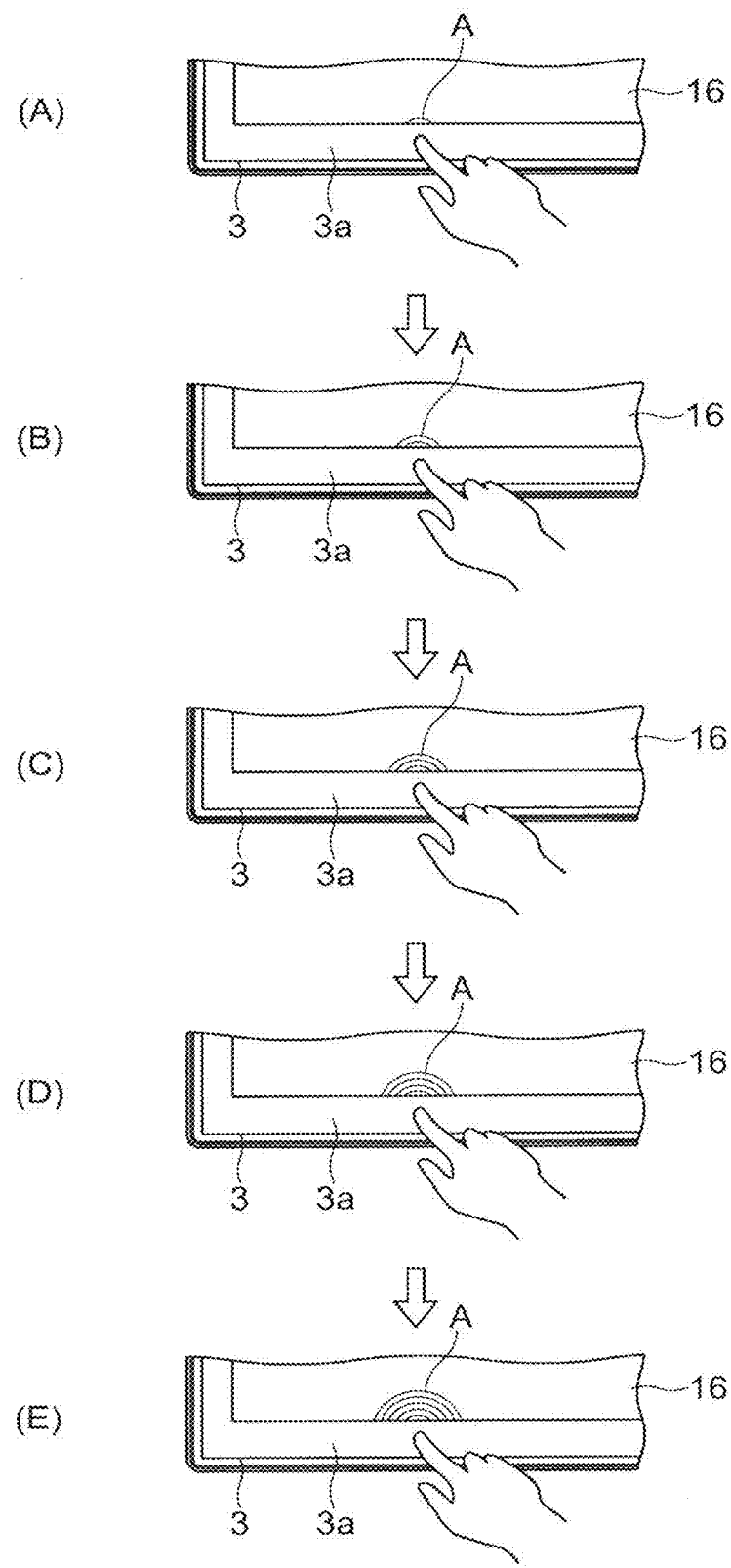
FIG. 18 is a view showing a state in which an animation is displayed when an area having the edge access function is touched in the PC.

FIG. 18 is a view showing a display flow of the ripple-like animation. As shown in the parts A to E of FIG. 18, the ripple-like animation is drawn to become larger with the touch position being the center as time elapses after the user has touched the print area 3a.

Figure 19:
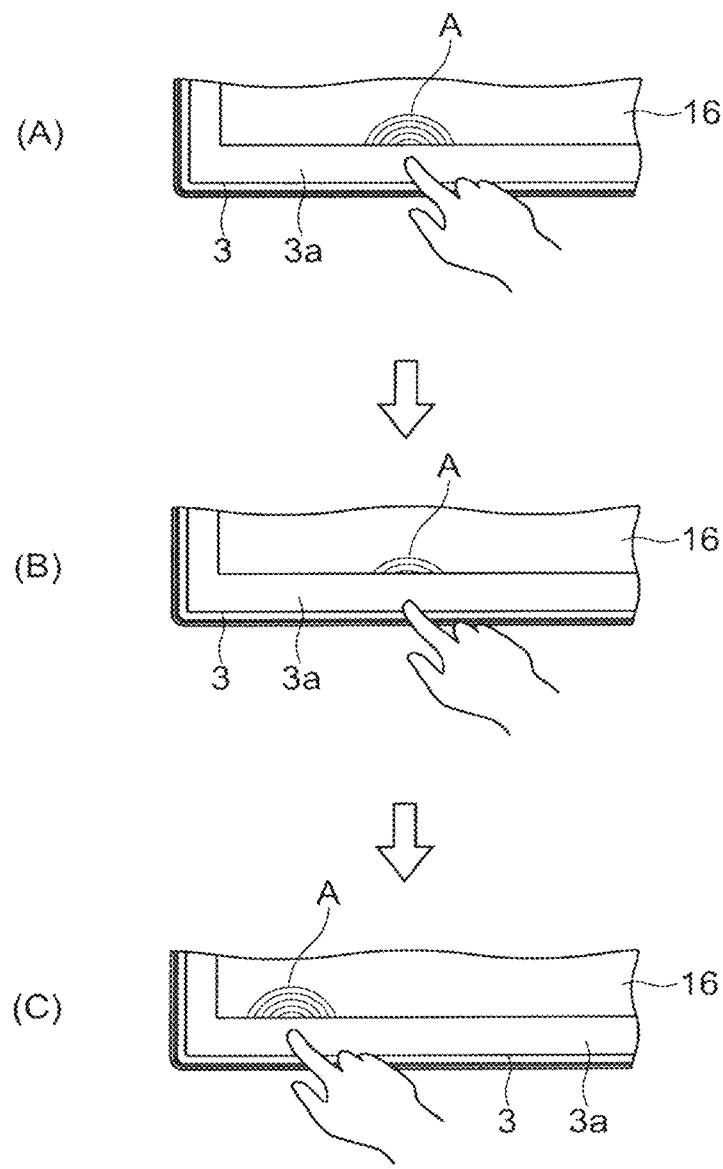
FIG. 19 is a view showing a state in which an animation is displayed when an area having the edge access function is touched in the PC.
Figure 20:
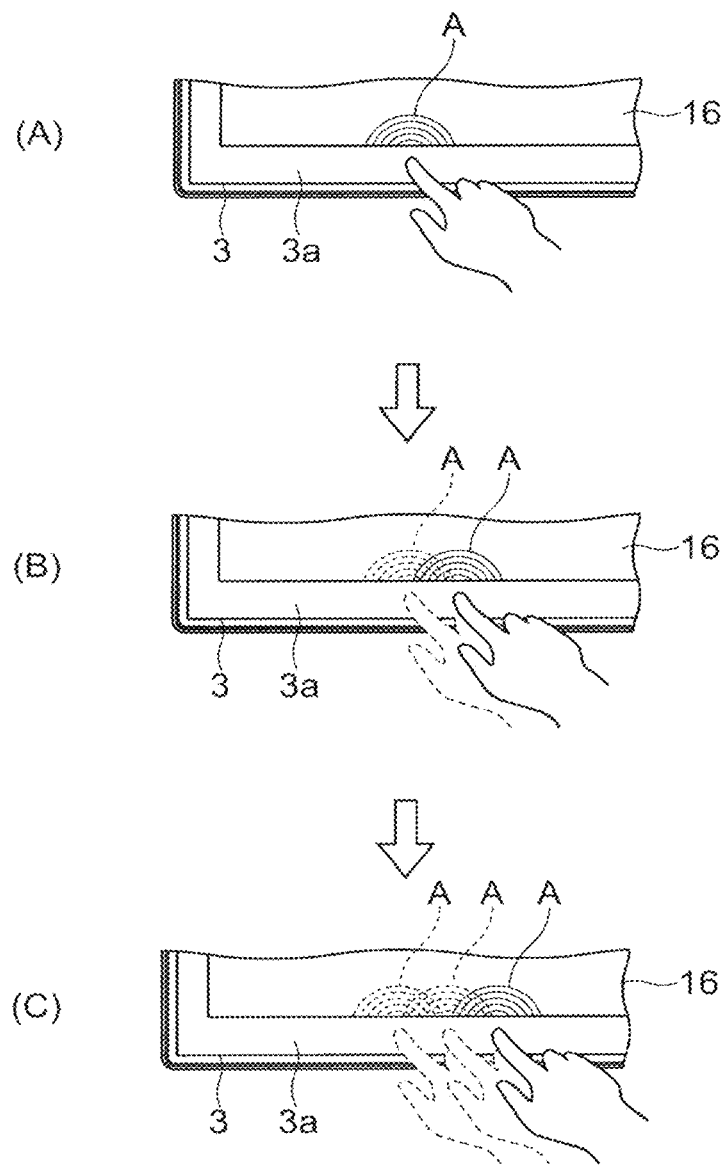
FIG. 20 is a view showing a state in which an animation is displayed when an area having the edge access function is touched in the PC.

FIGS. 19 and 20 are views showing a display flow of an animation in the case where after the touchdown with respect to the print area 3a, the touch position is moved. As shown in the parts A to C of FIG. 19, after the touchdown, the touch position is first moved downwardly, and then moved to the left-hand direction. Further, as shown in the parts A to C of FIG. 20, after the touchdown, the touch position is gradually moved to the right-hand direction. Also in such a case, the CPU 11 detects the touch position after each movement and draws an animation with the XY coordinates of the touch position after the movement being an origin as described above.

(Feedback Other than Animation)

In this embodiment, in addition to the visual feedback such as the ripple-like animation, the PC 100 can also perform an auditory feedback using sound effects through the speaker. For example, they are grouped based on meanings of cooperating functions, such as normal reaction, special use, event generation, event end, enlargement, reduction, and invalidation, and, by using musical images and operations corresponding thereto, it is possible to realize a feedback easy to understand.

As different sound effects, there are exemplified a general purpose tap sound, long-press operation sound, software keyboard and operation guide screen displaying sound, software keyboard and operation guide screen non-displaying sound, "Next" and enlargement operation sound, "Back" and reduction operation sound, operation invalidation time sound, and edge access function invalidation sound.

In addition, the PC 100 can also perform displaying in OSD (On-Screen Display) as another example of the visual feedback. For example, when the area G is touched, the PC 100 can also display OSD of "Back" on the LCD 16.

Regarding the ripple-like animation and the animation in OSD, the user can invalidate them on the setting screen or the like. With this, when the animation and OSD are not desired to be displayed, for example, during viewing a film, it is possible to set them not to be displayed.

CONCLUSION

As described above, according to this embodiment, the PC 100 can extend the operation range of the touch operation target displayed on the LCD 16 up to the outside (print area 3*a*) of the valid display area of the LCD 16, to thereby improve touch operability.

Modified Example

The present disclosure is not limited to the above-mentioned embodiment, and can be appropriately modified without departing from the gist of the present disclosure.

Figure 21:
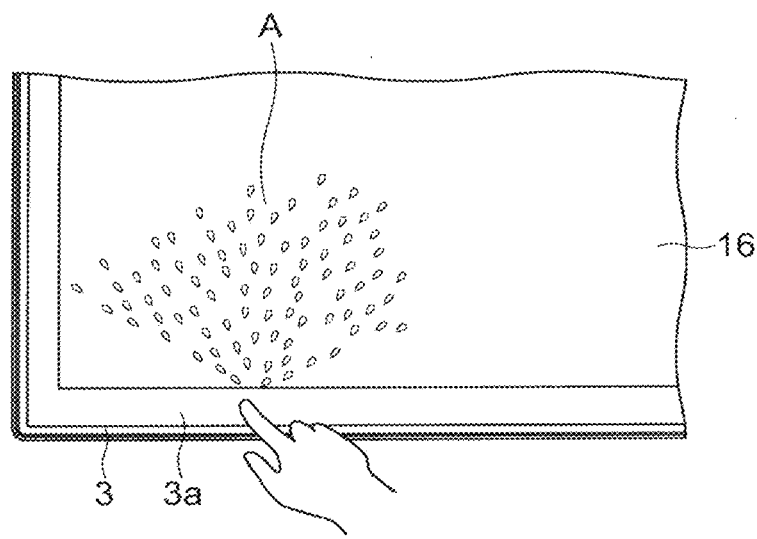
FIG. 21 is a view showing a state in which a PC displays an animation when an area having an edge access function is touched in another embodiment of the present disclosure.

Although in the above-mentioned embodiment, as the visual feedback about the touch operation with respect to the print area 3*a*, the ripple-like animation is displayed, the kind of animations is not limited thereto. For example, as shown in FIG. 21, with the XY coordinates of the touch position being the origin, an animation that looks as if a spray of water is made upwardly on the LCD 16 may be displayed.

Although in the above-mentioned embodiment, the button and the like regarding the edge access function are clearly indicated by printing in the print area 3*a*, they may be clearly indicated by carving instead of printing. Further, the user may be allowed to customize and order arbitrary printing or carving, which is designated by the user via the Internet or the like. In this case, by using a system of a programmable power key in a portion printed or carved by the custom order, an activation shortcut of an arbitrary program and a new function may be assigned to the print area 3*a*. With this, it is possible to provide the user with a set of a preinstalled service of software designated by the user and a printing or carving service of the edge access function regarding such software during shipping the PC 100.

Further, even in an area that is not printed or carved in the print area 3*a*, the user can add a new edge access function, for example, by rewriting an arbitrary button or character with a paint-stick and assigning software to the rewritten area by the system of the above-mentioned programmable power key.

Further, although in the above-mentioned embodiment, the area A to which the function of closing the window of the print area 3*a* is assigned is not subjected to printing or carving of the character, button, or the like indicating it, such printing or carving may be performed. That is the case with the area D and the area F, to which the functions of "Next" and "Back" are assigned, and the like.

Although in the above-mentioned embodiment, the edge access function is used for the operations with respect to the software or utility software installed into the PC 100, it may be used for other applications. For example, although onto the front surface or the like of a bezel of a PC, a commercial label for advertisement of a device or software included in the PC is attached in many cases, the edge access function may be assigned to the commercial label. That is, to the area, onto which the commercial label of the print area 3*a* is attached, a function of linking to a web site of its company on the Internet or the like may be assigned. By touching such an area, a connection to the Internet may be established and the web site may be displayed on the LCD 16. With this, it is possible for the third party side to provide a more effective advertisement, and it is also possible for the PC vendor to charge the third party side for discount charge of the advertisement fee of such an advertisement.

Although in the above-mentioned embodiment, the example in which the edge access function is executed with respect to the browser or various-content reproduction application has been shown, it can be similarly applied to various other applications. For example, by using both of a game application and a multi-touch detection function of the above-mentioned optical touch sensor unit 20, a dynamic operation by two or more users becomes possible. In this case, with the edge access function, the users do not need to touch the executed game screen, and hence the screen can be widely used as the screen is not obstructed by the hands.

Although in the above-mentioned embodiment, the PC 100 has an optical touch panel function through the optical touch sensor unit 20, it is also possible to use other touch panel systems including a resistive system, a capacitance system, an electromagnetic induction system, a matrix switch system, a surface acoustic wave system, and the like. Further, although in the above-mentioned embodiment, a touch to the glass plate 3 having an area larger than that of the LCD 16 is detected, a touch to the LCD 16 may be detected by a touch panel provided integrally with it and a touch to the area corresponding to the print area 3*a* may be detected by a touch sensor provided in the frame 4 surrounding the LCD 16, for example.

Although in the above-mentioned embodiment, the description has been made of the example in which the present disclosure is applied to the display integrated type PC, the present disclosure can be similarly applied to any other information processing apparatuses including a desktop type PC, a laptop type PC, a tablet type PC, a cell phone, a smart phone, a PDA (Personal Digital Assistant), an electronic book terminal, an electronic dictionary, a PVR (Personal Video Recorder), a digital still camera, a digital video camera, a television apparatus, a game machine, a car navigation apparatus, and the like.

The present application contains subject matter related to that disclosed in Japanese Priority Patent Application JP 2010-282955 filed in the Japan Patent Office on Dec. 20, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
 a display panel that includes a first area as a display surface as part of a predetermined display area for displaying information and a second area surrounding the first area;
 a glass plate having an area larger than the display panel, the glass plate integrally covering the display panel;
 an opaque edge access area, formed on a periphery of the glass plate, including a plurality of isolated areas, each area for executing a different processing function and including a visual indication of said processing function;
 a frame that surrounds the display panel and defines the display area;
 a touch sensor configured to generate a first level signal in response to touches on the glass plate on the first area including the display surface of the display panel and to generate a second level signal in response to touches on the isolated areas of the opaque edge access area, wherein the first level signal is of a higher level than the second level signal, thereby representing detection, with higher accuracy, of a touch on the first area than a touch on the isolated areas, and wherein the glass plate extends beyond the first area and overlaps the opaque edge access area;

a controller configured to execute predetermined processing when a touch on the display surface to the first area is detected, and to execute a respective different processing function when a touch to a position of one of the isolated areas on the opaque edge access area is detected, wherein the respective different processing function is a function that is not based on the information displayed in the first area; and an output unit configured to output when the touch to one of the isolated areas on the opaque edge access area is detected.

2. The information processing apparatus according to claim 1, wherein the controller controls, when the touch to the opaque edge access area is detected, the output unit to display on the display panel a predetermined animation indicating detection of the touch.

3. The information processing apparatus according to claim 2, wherein the controller controls the output unit so that the animation becomes gradually larger from the position of the touch in the opaque edge access area.

4. The information processing apparatus according to claim 1, wherein the output unit includes a speaker, and the controller controls, when the touch to the opaque edge access area is detected, the output unit to output through the speaker a predetermined sound indicating detection of the touch.

5. The information processing apparatus according to claim 1, wherein the glass plate includes one of printed information and carved information indicating content of the predetermined processing at a position corresponding to the opaque edge access area in one of a front surface and a back surface of the glass plate.

6. An information processing method in an information processing apparatus including a display panel, a glass plate, a frame, an opaque edge access area including a plurality of isolated areas, each area for executing a different processing function and including a visual indication of said processing function, and a touch sensor, the display panel including a first area as a display surface as part of a predetermined display area for displaying information and a second area surrounding the first area, the frame surrounds the display panel and defines the display area, and the glass plate extending beyond the predetermined display area, has an area larger than the display panel, integrally covers the display panel and overlaps the opaque edge access area which is formed on a periphery of the glass plate, the method comprising:

(a) generating, by the touch sensor, a first level signal in response to touches on the glass plate to the first area including the display surface of the display panel and (b) generate a second level signal in response to touches on the isolated areas of the opaque edge access area, wherein the first level signal is of a higher level than the second level signal, thereby representing detection, with higher accuracy, of a touch on the first area than a touch on the isolated areas, executing predetermined processing when a touch on the display surface to the first area is detected;

executing a respective different processing function when a touch to a position of one of the isolated areas on the opaque edge access area is detected, wherein the respective different processing function is a function that is not based on the information displayed in the first area; and outputting feedback in response to detection of touch to one of the isolated areas on the opaque edge access area.

7. An information processing apparatus, comprising:

a display panel that includes a display surface as part of a predetermined display area for displaying information;

a glass plate having an area larger than the display panel, the glass plate integrally covering the display panel;

an opaque edge access area formed on a periphery of the glass plate beyond the predetermined display area of the display panel, the opaque edge access area including a plurality of isolated areas, each area for executing a different processing function and including a visual indication of said processing function;

a frame that surrounds the display panel and defines the display area;

a touch sensor configured to generate a first level signal in response to touches on the glass plate on the display surface of the display panel and to generate a second level signal in response to touches on the isolated areas of the opaque edge access area, wherein the first level signal is of a higher level than the second level signal, thereby representing detection, with higher accuracy, of a touch on the display surface of the display panel than a touch on the isolated areas, and wherein the glass plate extends beyond the predetermined display area and overlaps the opaque edge access area;

a controller configured to execute a respective different processing function when a touch on the display surface is detected, and to execute the respective different processing function when a touch to a position of one of the isolated areas on the opaque edge access area is detected, wherein the respective different processing function is a function that is not based on the information displayed in the first area; and an output unit configured to output when the touch to one of the isolated areas on the opaque edge access area is detected.

8. An information processing method in an information processing apparatus including a display panel, a glass plate, a frame, an opaque edge access area including a plurality of isolated areas, each area for executing a different processing function and including a visual indication of said processing function, and a touch sensor, the display panel including a display surface as part of a predetermined display area surrounded by the frame for displaying information, and the glass plate extending beyond the predetermined display area, has an area larger than the display panel, overlaps the opaque edge access area, which is formed on a periphery of the glass plate, and integrally covers the display panel, the frame surrounds the display panel and defines the display area, the method comprising:

(a) generating, by the touch sensor, a first level signal in response to touches on the glass plate to the display surface of the display panel and (b) generating a second level signal in response to touches on the isolated areas of the opaque edge access area, wherein the first level signal is of a higher level than the second level signal, thereby representing detection, with higher accuracy, of a touch to the display surface than a touch on the isolated areas;

executing predetermined processing when a touch on the display surface is detected;

executing a respective different processing function when a touch to a position of one of the isolated areas on the opaque edge access area is detected, wherein the respective different processing function is a function that is not based on the information displayed in the first area; and outputting feedback in response to detection of touch to one of the isolated areas on the opaque edge access area.

* * * * *